United States Patent
Scheibel et al.

(10) Patent No.: US 10,744,573 B2
(45) Date of Patent: Aug. 18, 2020

(54) METHODS FOR CUTTING ALIGNED FULL SIZE HOLES

(71) Applicant: THE BOEING COMPANY, Chicago, IL (US)

(72) Inventors: John P. Scheibel, Florissant, MO (US); James L. Scherer, St. Peters, MO (US); Michael A. Ward, St. Louis, MO (US)

(73) Assignee: THE BOEING COMPANY, Chicago, IL (US)

(*) Notice: Subject to any disclaimer, the term of this patent is extended or adjusted under 35 U.S.C. 154(b) by 0 days.

(21) Appl. No.: 16/151,534

(22) Filed: Oct. 4, 2018

(65) Prior Publication Data

US 2020/0108456 A1 Apr. 9, 2020

(51) Int. Cl.
*B23P 19/10* (2006.01)
*B23B 51/00* (2006.01)
*B23D 77/12* (2006.01)

(52) U.S. Cl.
CPC .......... *B23B 51/0018* (2013.01); *B23P 19/10* (2013.01); *B23B 2215/04* (2013.01); *B23B 2228/36* (2013.01); *B23D 77/12* (2013.01); *B23D 2277/68* (2013.01); *B23D 2277/72* (2013.01); *Y10T 408/5584* (2015.01)

(58) Field of Classification Search
CPC .......... B23B 2251/60; B23B 2251/603; B23B 2251/606; B23B 51/107; B23B 51/0018; B23B 51/0426; B23B 2215/04; B23B 2228/36; B23B 2270/34; B23B 35/00; B23D 77/12; B23D 2227/68; B23P 19/10; Y10T 408/03; Y10T 408/8923
See application file for complete search history.

(56) References Cited

U.S. PATENT DOCUMENTS

| 4,815,902 A * | 3/1989 | Durfee, Jr. ............ B23B 51/108 408/225 |
|---|---|---|
| 7,093,360 B1 * | 8/2006 | Craig ...................... B23B 5/163 29/402.08 |
| 7,207,752 B2 * | 4/2007 | Schulte .................. B23D 77/00 408/1 R |
| 9,573,209 B2 | 2/2017 | Scheibel et al. |
| 9,643,260 B2 * | 5/2017 | Lipczynski ........... B23B 51/009 |
| 2014/0050545 A1 * | 2/2014 | Bailleul ............. B23B 51/0018 408/201 |

* cited by examiner

Primary Examiner — Eric A. Gates
Assistant Examiner — Chwen-Wei Su
(74) Attorney, Agent, or Firm — Marshall, Gerstein & Borun LLP

(57) ABSTRACT

A method for enlarging each one of an initial pair of holes, which includes a first hole, extending through a first component, and a second hole, extending through a second component, includes inserting a pilot member, corresponding to a tolerance of misalignment of the first hole and the second hole of the initial pair of holes, such that pilot member passes through a clearance gap, defined by at least a portion of a boundary of first hole and at least a portion of a boundary of second hole with pilot member having a first central axis. The method also includes cutting a second pair of aligned holes through first and second components, respectively, with a cutter section, which has a second central axis.

17 Claims, 8 Drawing Sheets

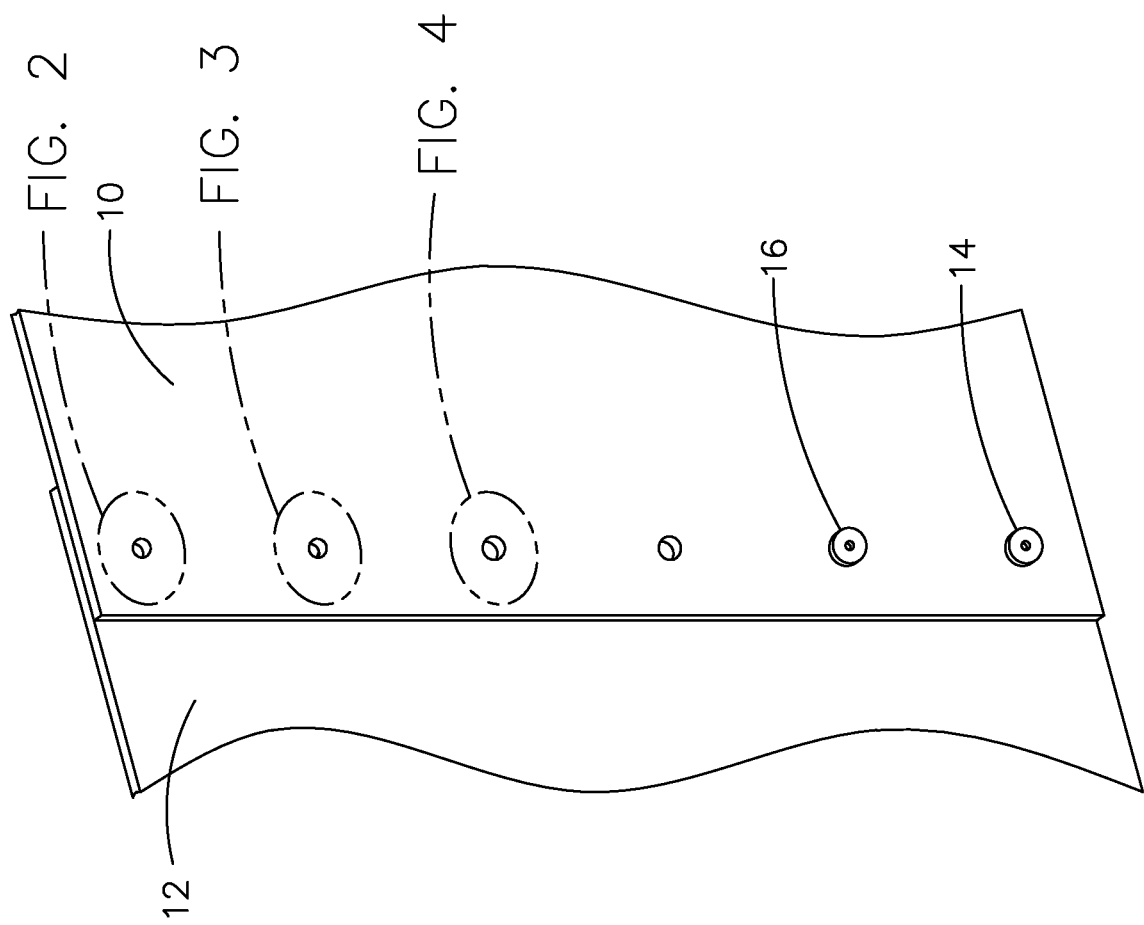

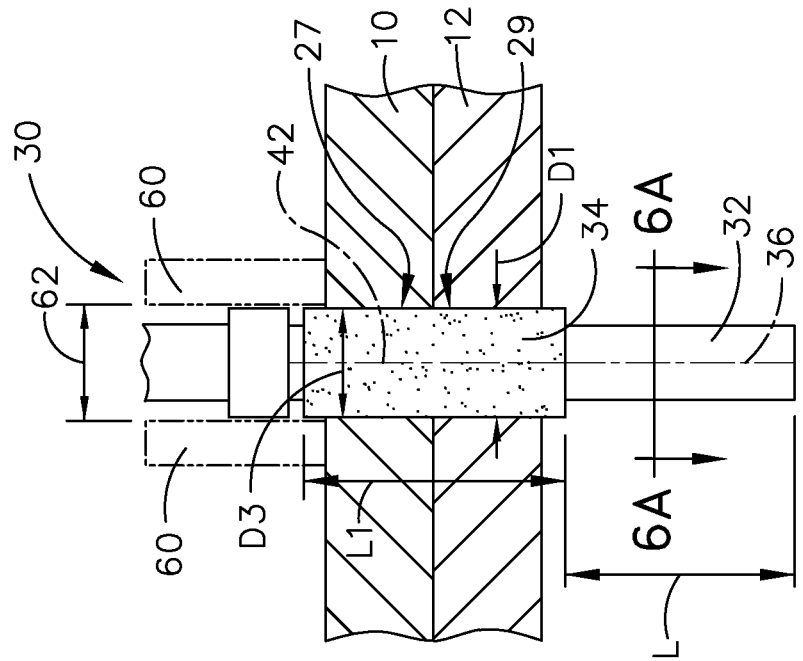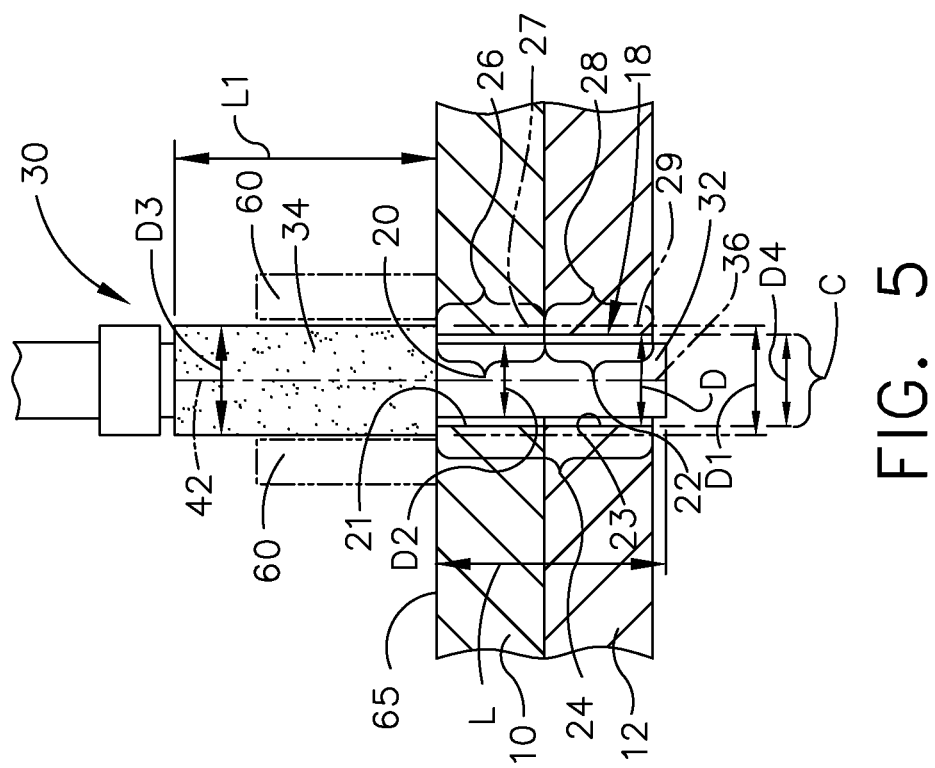

METHODS FOR CUTTING ALIGNED FULL SIZE HOLES

FIELD

This disclosure involves a cutter assembly and a method for cutting aligned full sized holes into two or more components and more particularly, cutting aligned full sized holes with increasing diameters of non-full sized holes.

BACKGROUND

In a process in assembling a structure, such as an aircraft, the process often includes separately fabricating two or more parts or components wherein the fabrication of the two or more components includes positioning holes in each of the components. The holes in each of the components are intended to be in alignment with one another when the components are placed together at a time of joining the two or more components in assembling the structure. Alignment of the holes positioned in the separate components may be needed for one of a number of purposes. One of the purposes includes passing a fastener through the aligned holes to optimize securement of the two or more components.

It can be a challenging task to drill or cut holes in separate components with the intent for the holes to be positioned in alignment with one another at the time of joining the components together. Misalignment of a pair of holes positioned in two components can occur for various reasons including manufacturing process variations.

SUMMARY

An example includes a cutter assembly for increasing a diameter of an initial pair of holes that includes a first hole defined through a first component and a second hole defined through a second component. The cutter assembly includes a pilot member having a pilot diameter corresponding to a tolerance of misalignment of the first hole and the second hole. The cutter assembly further includes a cutter section associated with the pilot member wherein the cutter section has a cutting diameter larger than the pilot diameter and the cutter section is configured to produce a second pair of aligned holes in the first and second components having a diameter dimension of that of the cutting diameter.

An example includes a method for increasing a diameter of an initial pair of holes that includes a first hole defined by and extends through a first component and a second hole defined by and extends through a second component. The method includes a step of inserting a pilot member having a pilot diameter corresponding to a tolerance of misalignment of the initial pair of holes such that the pilot member passes through a clearance gap defined by at least a portion of a boundary of the first hole of the initial pair of holes and at least a portion of a boundary of the second hole of the initial pair of holes. The method further includes cutting a second pair of aligned holes through the first and second components respectively with a cutter section associated with the pilot member wherein the cutter section has a cutting diameter larger than the pilot diameter and larger than a diameter of the initial pair of holes.

The features, functions, and advantages that have been discussed can be achieved independently in various embodiments or may be combined in yet other embodiments further details of which can be seen with reference to the following description and drawings.

BRIEF SUMMARY OF THE DRAWINGS

FIG. 1 is a partial perspective view of two components to be secured together in fabricating an assembly with holes positioned in each of the two components;

FIG. 5 is a schematic cross section view of the cutter assembly with a pilot member of the cutter assembly centrally positioned spaced apart from boundaries of the initial pair of non-full sized holes of FIG. 2 and extending through the initial pair of non-full sized holes with a bushing, shown in phantom, positioned on a first component for providing guidance for the cutter assembly;

FIG. 6 is a schematic cross section view of FIG. 5 with a cutter section of the cutter assembly having cut full-sized aligned holes through the two components;

DESCRIPTION

The examples described herein can produce high quality holes, which are aligned with one another, with using a single cutter pass and can reduce the time and expense involved in attempting to align the holes to a finished full sized hole condition.

In referring to FIG. 1, two components, first component 10 and second component 12, are shown being joined together. Non-full-sized holes have been placed in each of first and second components 10 and 12 and designated as FIG. 2 and FIG. 3 in FIG. 1. These non-full-sized holes are shown in more detail in FIGS. 2 and 3. Non-full-sized holes are under sized holes relative to aligned finished full-sized aligned holes, which are typically designated in engineering specifications for securement in fabricating an assembly of first and second components 10 and 12.

Figure 3:
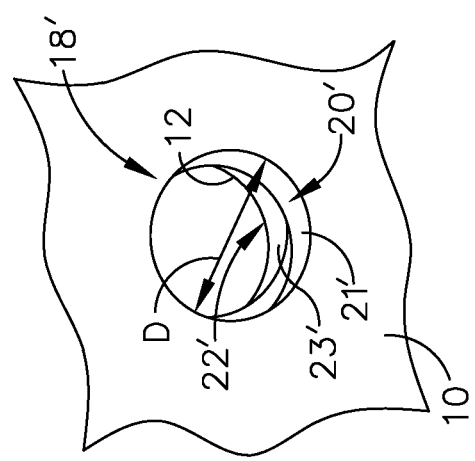
FIG. 3 is an enlarged partial perspective view of an initial pair of non-full sized holes designated as FIG. 3 in FIG. 1, which are in misalignment with one another.
Figure 2:
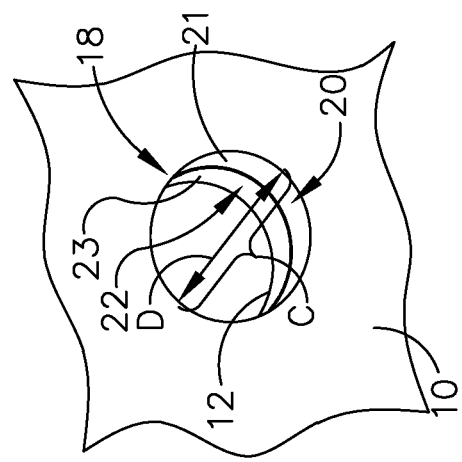
FIG. 2 is an enlarged partial perspective view of an initial pair of non-full sized holes designated as FIG. 2 in FIG. 1, which are in alignment with one another.

In FIG. 2 the non-full sized holes are aligned and in FIG. 3 the non-full-sized holes are nonaligned. In either example with respect to non-full-sized holes shown in FIGS. 2 and 3, the holes are increased in diameter and convert the non-full-sized holes to full-sized aligned holes as designated as FIG. 4 in FIG. 1 and shown in more detail in FIG. 4. In attaining aligned full-sized holes such as shown in FIG. 4, fasteners such as 14 and 16 can be employed through the full-sized aligned holes to provide optimal securement of first and second components 10 and 12.

In FIG. 2, an example is shown of an initial pair of holes 18, also referred to as "non-full-sized holes" include first and second holes 20, 22. First hole 20 is defined by and extends through first component 10 and second hole 22 is defined by and extends through second component 12. First and second components 10, 12, are fabricated separately and positioned in overlying or stacked relationship to one another. Diameter D is smaller in size than a diameter called for in engineering specifications for an aligned finished full-sized hole used for securement of first and second components 10, 12. In the example of initial pair of holes 18 shown in FIG. 2, initial pair of holes 18 are shown in alignment with one another. Regardless of initial pair of holes 18 being in alignment with one another, diameter D of initial pair of holes 18 is increased in dimension to attain an aligned finished full-sized hole condition so as to be able to receive a full sized standard fastener for optimal securement of first and second components 10, 12.

In FIG. 3, a second example is shown of initial pair of holes 18'. Initial pair of holes 18' or non-full-sized holes includes first hole 20' and second hole 22'. First hole 20' is defined by and extends through first component 10 and second hole 22' is defined by and extends through second component 12. First and second components 10, 12 are in overlying or stacked relationship to one another. Initial pair of holes 18' are cut through first and second components 10, 12 separately when each of the first and second components 10, 12 are fabricated. First and second holes 20', 22' of initial pair of holes 18' each have diameter D, as mentioned earlier for initial pair of holes 18 of FIG. 2, which is smaller than a diameter called for in the engineering specifications for a finished aligned full-sized holes used for securement of first and second components 10, 12. In the example of initial pair of holes 18' shown in FIG. 3, initial pair of holes 18' is in misalignment. Misalignment of initial pair of holes 18', in this example, is at a maximum tolerance of misalignment in FIG. 3, which is further herein discussed. To attain engineering specifications for finished full-sized aligned holes, diameter D of initial pair of holes 18' is increased in dimension and the resulting holes are in alignment with one another to receive a full-sized fastener for optimal securement.

Figure 4:
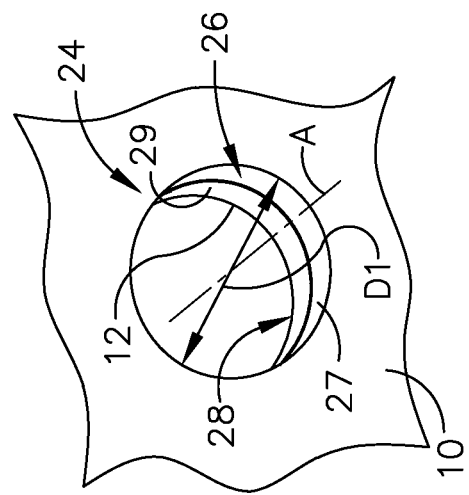
FIG. 4 is an enlarged partial perspective view of a pair of full sized aligned holes designated as FIG. 4 in FIG. 1, which was previously a pair of non-full sized holes such as shown for example in FIG. 2 or 3.
Figure 14:
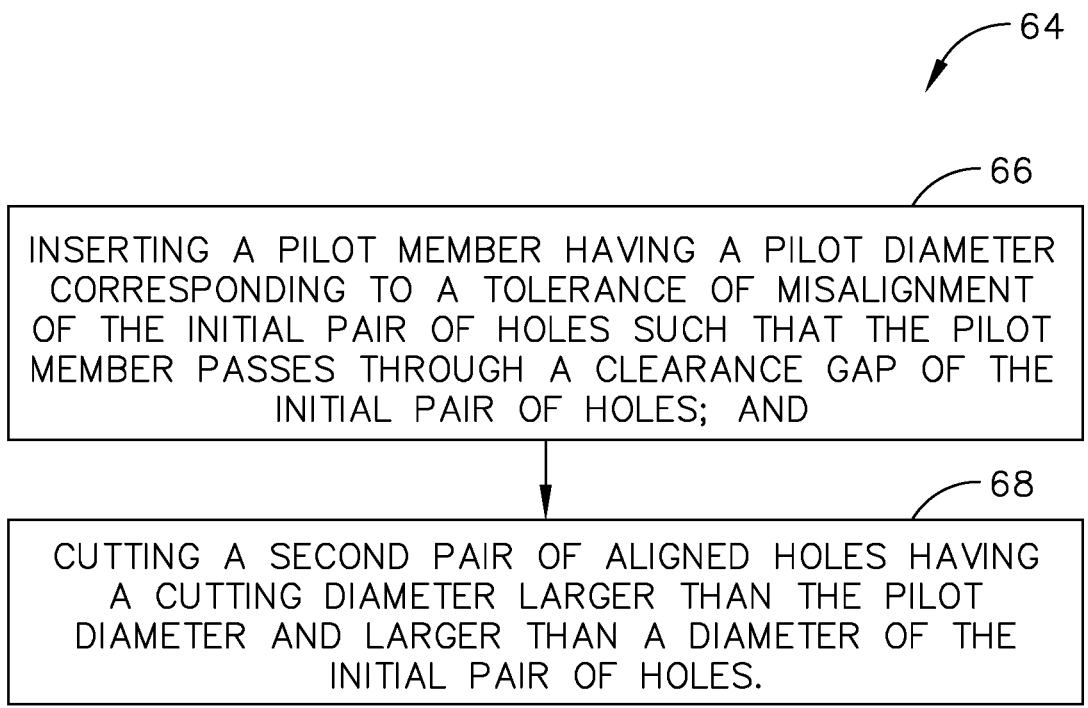
FIG. 14 is a flow chart of a method for increasing a diameter of an initial pair of holes.

In referring to FIG. 4, an example is shown of second pair of aligned holes 24, also referred to as "aligned full-sized holes", which conform to engineering specifications for assembling and securement of first component 10 and second component 12. Second pair of aligned holes 24 have a diameter D1, which is greater in size than diameter D of initial pair of holes 18, 18'. Second pair of aligned holes or aligned full-sized holes 24 includes first hole 26, which is defined by and extends through first component 10, and includes second hole 28, which is defined by and extends through second component 12. Second pair of aligned holes 24 is able to receive a full-sized standard fastener. Second pair of aligned holes or aligned full-sized holes 24 is attained from initial pair of holes 18 or 18' as shown in FIGS. 2 and 3 respectively, with use of the cutter assembly 30, as seen in FIGS. 5-8 and method for increasing diameter D, as seen in FIG. 14, which are herein described. Second pair of aligned holes or aligned full-sized holes 24 can be attained with a single pass through components 10 and 12 with cutter assembly 30, as seen in FIGS. 5 and 6. Cutter assembly 30 has cutter section 34 having a cutting diameter D3, which forms second pair of aligned holes 24 having diameter D1 from cutting diameter D3 of cutter section 34.

Figure 11:
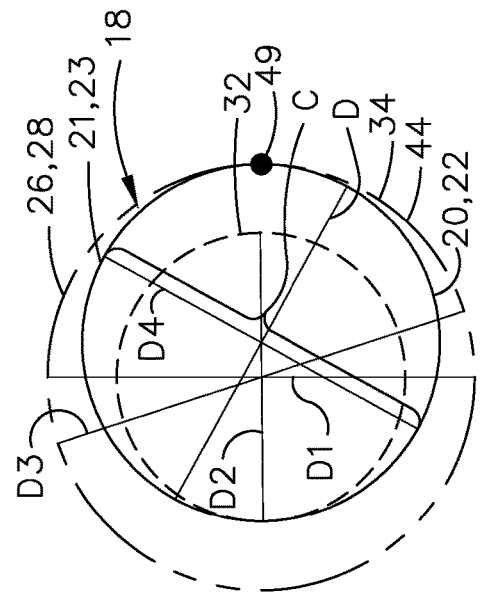
FIG. 11 is a schematic plan view representative of the position of the initial pair of non-full sized holes in alignment with one another of FIG. 2 along with the positions of the pilot member and the cutting section of the cutter assembly of FIG. 7.
Figure 12:
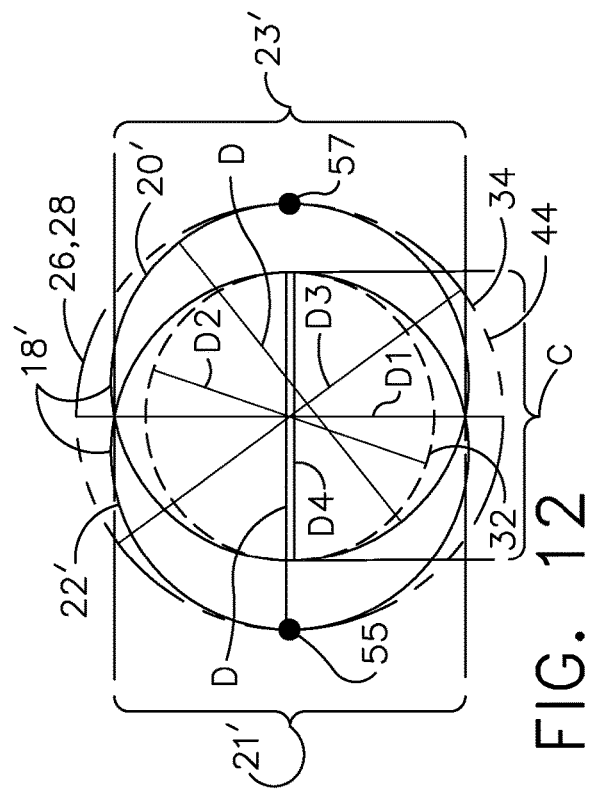
FIG. 12 is a schematic plan view representative of the position of the initial pair of non-full sized holes in misalignment with one another of FIG. 3 along with the positions of the pilot member and the cutting section of the cutter assembly of FIG. 8.

In referring to FIGS. 5 and 6, cutter assembly 30 is shown. Cutter assembly 30 includes pilot member 32 having pilot diameter D2 corresponding to a tolerance of misalignment of first hole 20 and second hole 22 of initial pair of holes 18. Tolerance of misalignment is the amount of misalignment of the initial pair of holes that would allow a circumference of cutter section 34 to encircle the boundaries of the initial pair of holes. A range of misalignment of initial pair of holes for operation of cutter assembly 30 includes initial pair of holes 18 at a minimum amount of misalignment, with initial pair of holes 18 being aligned, as seen in FIGS. 2, 5, 7, 10, and 11, wherein pilot diameter D2 freely passes through first hole 20 and second hole 22. In contrast, first hole 20' and second hole 22' of initial pair of holes 18', in this example, are at a greatest amount of misalignment, as seen in FIGS. 3, 8, and 12, within the tolerance of misalignment of first hole 20' and second hole 22', wherein pilot diameter D2 snuggly slides along boundaries of initial pair of holes 18'.

Cutter assembly 30 includes cutter section 34 associated with pilot member 32 wherein cutter section 34 is connected or integral with pilot member 32. Cutter section 34 can include one of a variety of material removing devices. Pilot member 32, in this example, is integral with cutter section 34, as a result, as cutter section 34 rotates and cuts through first and second components 10, 12, pilot member 32 also rotates with cutter section 34. In other configurations, pilot member 32 may be connected to cutter section 34, wherein pilot member 32 is fixed relative to cutter section 34 without rotating with cutter section 34. Cutter section 34 has cutting diameter D3, as mentioned earlier, which is larger than pilot diameter D2. Cutter section 34 is configured to produce second pair of aligned holes or aligned full-sized holes 24 in first and second components 10, 12 having diameter D1 from cutting diameter D3 of cutter section 34.

Figure 7:
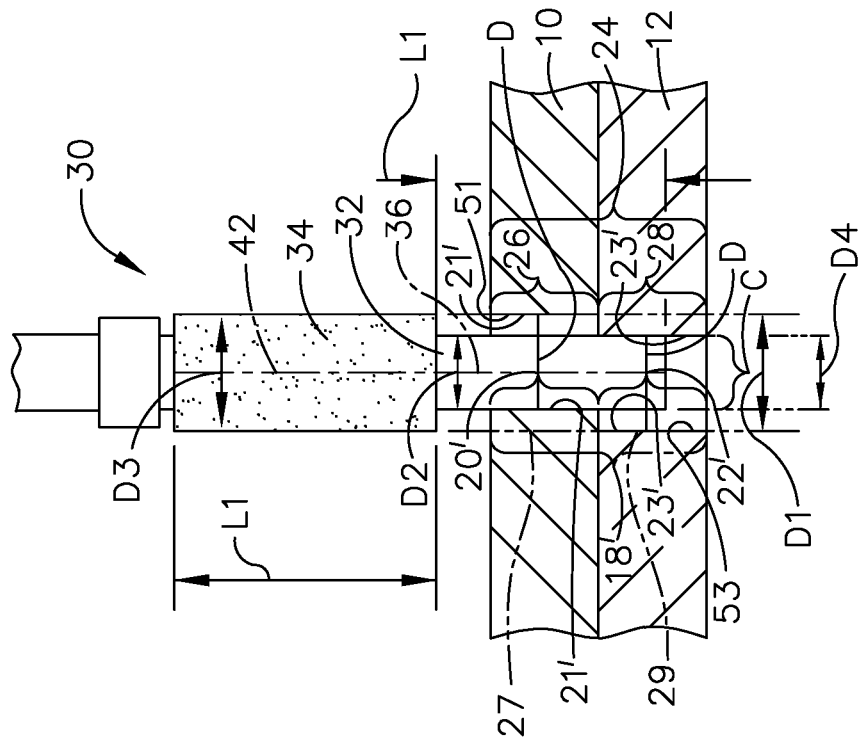
FIG. 7 is a schematic cross section view of the cutter assembly with the pilot member of the cutter assembly positioned extending through the initial pair of non-full sized holes of FIG. 2 with the pilot member positioned along and against a boundary of each of the initial pair of non-full sized holes.
Figure 8:
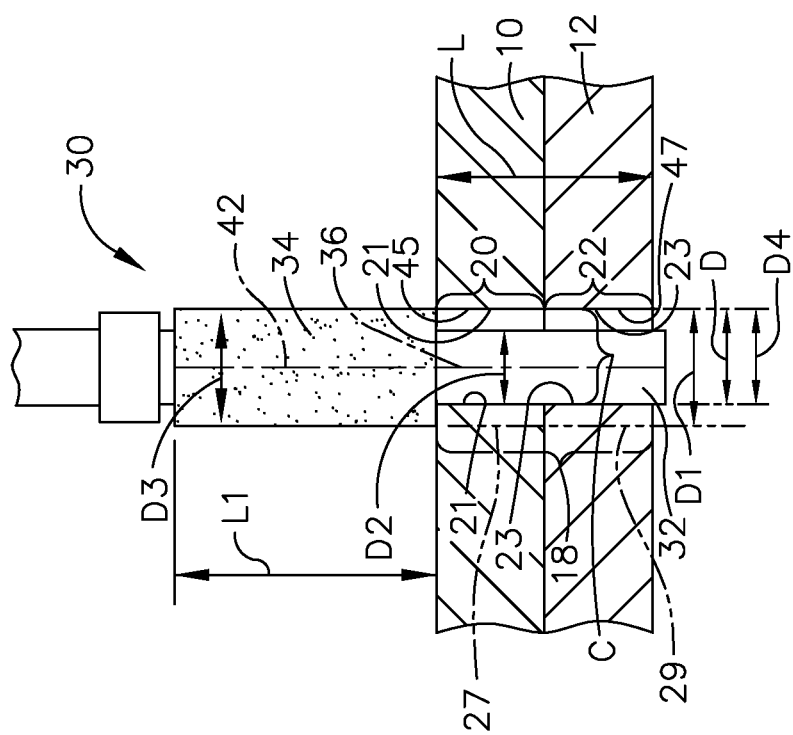
FIG. 8 is a schematic cross section view of the cutter assembly with the pilot member of the cutter assembly being positioned to extend through the initial pair of non-full sized holes in misalignment of FIG. 3 with one side of the pilot member positioned against a boundary of the top hole of the initial pair of non-full sized holes and with an opposing side of the pilot member positioned against a boundary of the lower hole of the initial pair of non-full sized holes.

Pilot member 32 of cutter assembly 30 has diameter D2, which is smaller than diameter D, as seen in FIGS. 5, 7, and 8 for example, of first and second holes 20, 22 of initial pair of holes 18 and first and second holes 20', 22' of initial pair of holes 18' as shown in FIGS. 2 and 3, respectively. Cutting diameter D3, in contrast, is larger than diameter D of first and second holes 20, 22 of initial pair of holes 18 and first and second holes 20', 22' of initial pair of holes 18'.

Figure 6A:
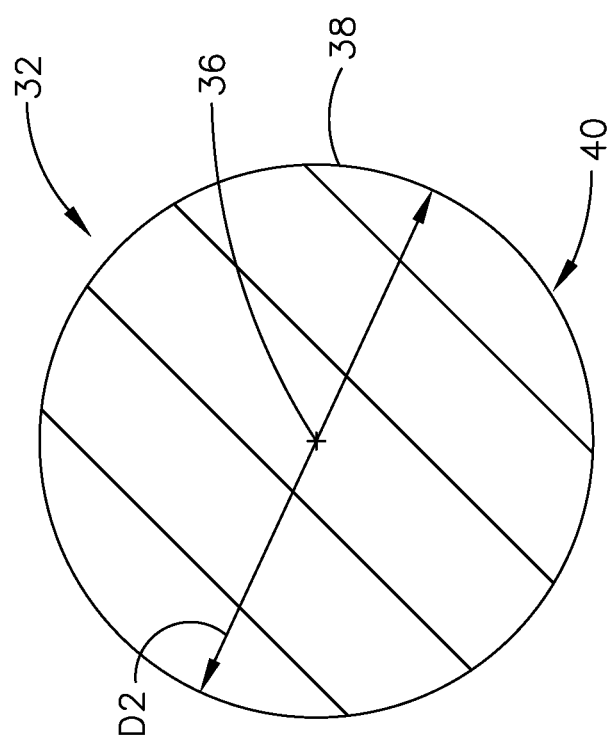
FIG. 6A is a cross section along line 6A-6A of FIG. 6.

Pilot member 32 includes first central axis 36, as seen in FIGS. 5-8, which extends along length L, as seen in FIGS. 5-8, of pilot member 32 and includes curved external surface 38, as seen in FIG. 6A, which extends around first central axis 36. In further referring to FIG. 6A, a cross section is shown of pilot member 32 having curved external surface 38 defining circular configuration 40 extending around first central axis 36 having pilot diameter D2. Pilot member 32 can be constructed in one of a variety of configurations including a solid cylindrical shape, as shown in the example in FIG. 6A, a hollow cylindrical shape or other suitable configuration providing curved external surface 38, which extends about first central axis 36 providing pilot diameter D2, wherein curved external surface 38 is positioned to extend along length L of pilot member 32. Length L of pilot member 32 is of a sufficient length to permit pilot member 32 to extend through initial non-full-sized openings of two or more stacked components.

Cutter section 34 has second central axis 42, which extends along length L1 of cutter section 34. Pilot member 32 and cutter section 34 are connected to one another and as described above in this example are integral with one another. First central axis 36 of pilot member 32 is coaxial with second central axis 42 of cutter section 34. In this example, this coaxial alignment of first central axis 36 and second central axis 42 is coaxial with a central axis A of second pair of aligned holes or aligned full-sized holes 24 with boundaries 27 and 29 of first and second holes 26 and 28 respectively aligned, as seen in FIG. 4, with cutter section 34 producing aligned full-sized holes 24.

Pilot diameter D2 corresponds to a tolerance of misalignment, as described above, of first hole 20 and second hole 22 of initial pair of holes 18, which may be aligned with respect to one another, as seen in FIG. 2, or may be in misalignment with one another, as seen in FIG. 3 with respect to first hole 20' and second hole 22' of initial pair of holes 18'.

Pilot diameter D2 is selected to have a dimension which permits pilot member 32 with pilot diameter D2 to pass through an initial pair of holes, such as initial pair of holes 18, which are aligned or pass through an initial pair of holes that are misaligned having a misalignment up to and including a maximum misalignment of initial pair of holes 18'. At the same time, the selection of pilot diameter D2 accommodates cutting diameter D3 dimension of cutter section 34 such that with pilot diameter D2 passing through the initial pair of holes circumference 44 of cutting section 34 can encircle the initial pair of holes and cut and complete aligned full sized holes.

Figure 10:
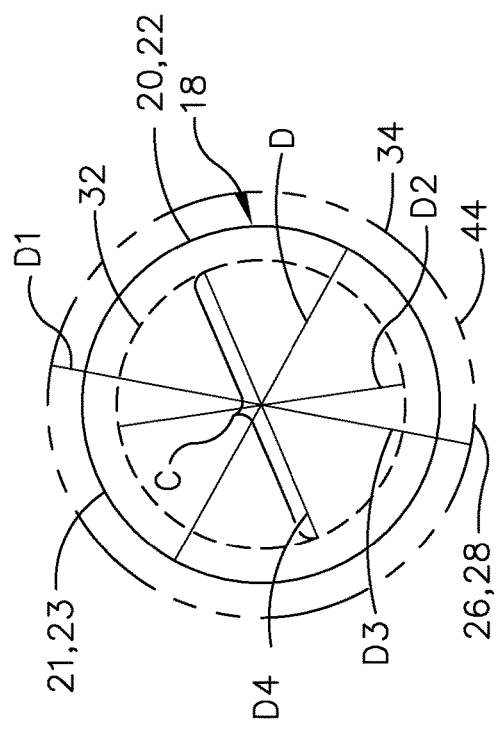
FIG. 10 is a schematic plan view representative of the position of the initial pair of non-full sized holes in alignment with one another of FIG. 2 along with the positions of the pilot member and the cutting section of the cutter assembly of FIG. 5.

The tolerance of misalignment includes a width dimension D4 of clearance gap C for passage through first and second components 10, 12. Clearance gap C is defined by at least a portion of boundary 21 of first hole 20 of initial pair of holes 18 and at least a portion of boundary 23 of second hole 22 of initial pair of holes 18, as seen in FIGS. 2, 5, 7, 10, and 11 wherein in this example initial pair of holes 18 are in alignment. In this configuration of initial pair of holes 18 being in alignment, entire boundary 21 of first hole 20 and entire boundary 23 of second hole 22 define width dimension D4 of clearance gap C. Each of first hole 20 and second hole 22 have diameter D forming width dimension D4 of clearance gap C. Width dimension D4 of clearance gap C, as seen in FIGS. 5 and 10, is greater in dimension than pilot diameter D2 of pilot member 32 allowing pilot member 32 to extend through clearance gap C such that circumference 44 of cutter section 34, as seen in FIGS. 5 and 10, is aligned to cut second pair of aligned holes 24 of FIGS. 4 and 5, increasing diameter D of initial pair of holes 18 to diameter D1.

Cutting diameter D3 of cutter section 34 is larger than diameter D of initial pair of holes 18 such that first hole 26 of second pair of aligned holes 24 encircles first hole 20 of initial pair of holes 18 and second hole 28 of second pair of aligned holes 24 encircles second hole 22 of initial pair of holes 18 as seen in FIGS. 5 and 10 with cutter section 34 cutting through first and second components 10 and 12 in FIG. 6. With pilot member 32 centrally positioned within clearance gap C, as seen in FIG. 5, cutter section 34 is aligned for cutter section 34 to cut first hole 26 of second pair of aligned holes 24 having diameter D1 to extend through first component 10 along and spaced apart from boundary 21 of first hole 20 of initial pair of holes 18 and to cut second hole 28 of second pair of aligned holes 24 to extend through second component 12 along and spaced apart from boundary 23 of second hole 22 of initial pair of holes 18.

As mentioned above, the tolerance of misalignment includes a width dimension D4 of a clearance gap C for passage through first and second components 10, 12. Clearance gap C is defined by at least a portion of boundary 21 of first hole 20 of initial pair of holes 18 and at least a portion of boundary 23 of second hole 22 of initial pair of holes 18, as seen in FIGS. 2, 5, 7, 10, and 11, wherein initial pair of holes 18 are in alignment as earlier described. In this configuration of initial pair of holes 18 being in alignment, entire boundary 21 of first hole 20 and entire boundary 23 of second hole 22 define clearance gap C, as mentioned above, wherein each of first hole 20 and second hole 22 have diameter D forming width dimension D4 of clearance gap C. With respect to aligned initial pair of holes 18, as shown in FIGS. 7 and 11, width dimension D4 of clearance gap C is also shown. Width dimension D4 of clearance gap C, as seen in FIGS. 7 and 11, is greater in dimension than pilot diameter D2 of pilot member 32 allowing pilot member 32 to extend through clearance gap C such that circumference 44 of cutter section 34 is aligned to cut second pair of aligned holes 24 of FIGS. 4, 7, and 11 increasing diameter D of initial pair of holes 18 to a diameter D1. Cutting diameter D3 of cutter section 34 is larger than diameter D of initial pair of holes 18 such that first hole 26 of second pair of aligned holes 24 encircles first hole 20 of initial pair of holes 18 and second hole 28 of second pair of aligned holes 24 encircles second hole 22 of initial pair of holes 18 as seen in FIGS. 7 and 11 with cutter section 34 cutting through first and second components 10 and 12.

In the example shown in FIG. 7, pilot member 32 is positioned against boundary 21 and boundary 23 within clearance gap C of pair of initial holes 18. In this position, cutter section 34 is aligned to cut through first component 10 and form boundary 27 of first hole 26, as seen in FIG. 4, of second pair of aligned holes 24 to extend through first component 10 along line 45 tangential, as indicated in FIG. 7, with boundary 21 of first hole 20 of initial pair of holes 18. Further, cutter section 34 forms boundary 29 of second hole 28, as seen in FIG. 4, of second pair of aligned holes 24, which extends through second component 12 along line 47 tangential, as indicated in FIG. 7, with boundary 23 of second hole 22 of initial pair of holes 18. As seen in FIG. 11, end point 49 is an end point for line 45 which is in alignment with line 47. Thus, with pilot member 32 extending through clearance gap C at any position within clearance gap C cutter section 34 can cut second pair of full sized aligned holes 24 which will encircle first hole 20 and second hole 22 of initial pair of holes 18.

In referring to the example shown in FIGS. 8 and 12, initial pair of holes 18' are in maximum misalignment. The tolerance of misalignment includes a width dimension D4 of a clearance gap C defined by at least a portion of boundary 21' of first hole 20' of initial pair of holes 18' and at least a portion of boundary 23' of second hole 22' of initial pair of holes 18'. Initial pair of holes 18' are in a maximum amount of misalignment, wherein pilot member 32 can pass through clearance gap C and cutter assembly 30 can cut through first and second components 10, 12. Dimension D4 of clearance gap C is the smallest dimension in which pilot member 32 with diameter D2 can slide through clearance gap C with initial pair of holes 18' in maximum misalignment. Dimension D4 of FIG. 8 is smaller than dimension D4 of FIG. 7 where initial pair of holes 18 are in alignment. With initial pair of holes 18' in misalignment in FIG. 7, a portion of boundary 21' of first hole 20' and a portion of boundary 23' of second hole 22' define clearance gap C having width dimension D4. Clearance gap C allows pilot member 32, having pilot diameter D2, to slide and extend through clearance gap C along portion of boundary 21' and along portion of boundary 23' in FIG. 8. With pilot member 32 having slid through clearance gap C, circumference 44 of cutter section 34, as seen in FIGS. 8 and 12, is aligned to cut second pair of aligned holes 24 of FIGS. 4 and 8, increasing diameter D of initial pair of holes 18' to diameter D1. Cutting diameter D3 of cutter section 34 is larger than diameter D of initial pair of holes 18' such that first hole 26 of second pair of aligned holes 24 encircles first hole 20' of initial pair of holes 18' and second hole 28 of second pair of aligned holes 24 encircles second hole 22' of initial pair of holes 18' as seen in FIGS. 8 and 12 with cutter section 34 cutting through first and second components 10 and 12.

With cutter section 34, as seen in FIG. 8, aligned to cut through first and second components 10, 12, cutter section 34 can proceed to cut through first component 10 and form boundary 27 of first hole 26, as seen in FIG. 4, of second pair of aligned holes 24. Boundary 27 of first hole 26 extends through first component 10 along line 51 tangential with boundary 21' of first hole 20' of initial pair of holes 18', as seen in FIG. 8. Cutter section 34 further cuts through second component 12 and further forms boundary 29, as seen in FIG. 4, of second hole 28 of second pair of aligned holes 24. Boundary 29 of second hole 28 extends through second component 12 along line 53 tangential with boundary 23' of second hole 22' of initial pair of holes 18', as also seen in FIG. 8. As seen in FIGS. 8 and 12, point 55 is aligned with line 53 tangential with boundary 23' of second hole 22' and point 57 is an end point for line 51 tangential with boundary 21' of first hole 20'. Thus, with pilot member 32 extending through clearance gap C, as seen in FIG. 8, cutter section 34 can cut second pair of full-sized aligned holes 24, which encircles first hole 20' and second hole 22' of initial pair of holes 18'.

Figure 9:
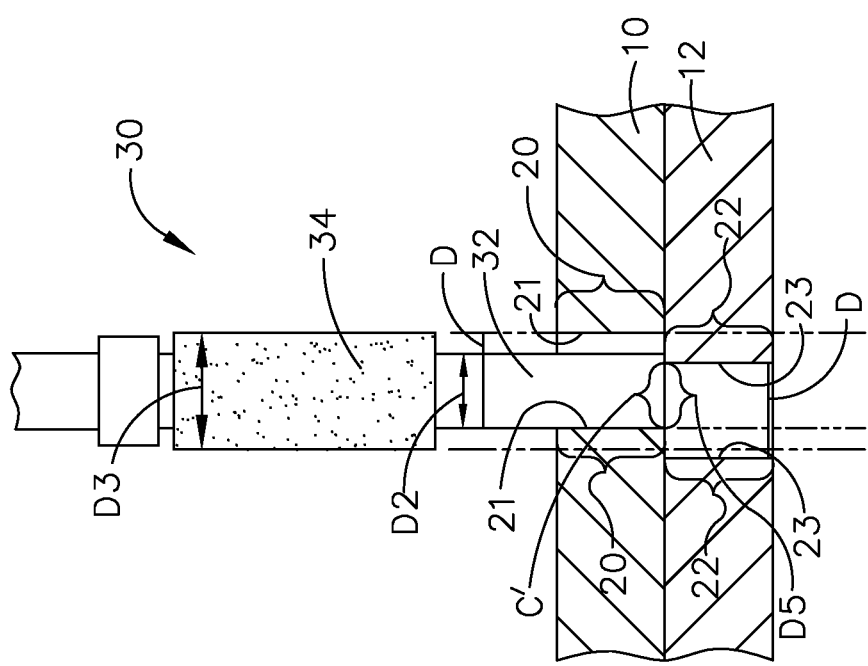
FIG. 9 is a schematic cross section view of the cutter assembly with the pilot member of the cutter assembly blocked from passing through the initial pair of non-full sized holes with the pilot member blocked by the lower component, which defines the lower hole, wherein a tolerance of misalignment of the initial pair of nonaligned non-full sized holes has been exceeded.
Figure 13:
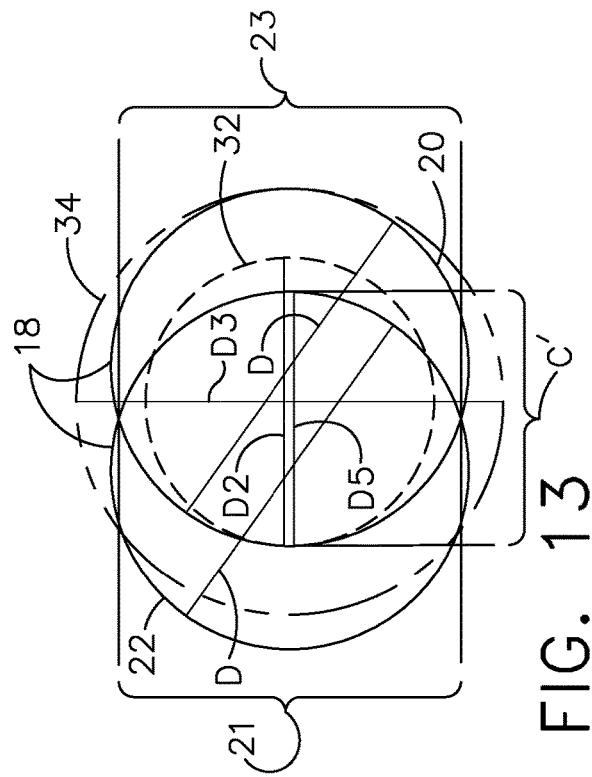
FIG. 13 is a schematic plan view representative of a position of the initial pair of non-full sized holes of FIG. 9 wherein the tolerance of misalignment of the initial pair of nonaligned non-full sized holes has been exceeded along with the positions of the pilot member and the cutting section of the cutter assembly of FIG. 9.

In referring to FIGS. 9 and 13, first and second holes 20 and 22 are in misalignment with one another having a clearance gap C' defined by at least a portion of boundary 21 of first hole 20 and by at least a portion of boundary 23 of second hole 22 having dimension D5. Pilot member 32 has diameter D2 which now is greater than dimension D5 of clearance gap C' resulting in pilot member 32 abutting component 12 and being blocked from penetrating second hole 22. Cutter section 34, with cutting diameter D3, is insufficient in dimension to provide a cutting of a second pair of aligned full-sized holes that would encircle both first hole 20 and second hole 22 of initial pair of holes 18. As a result, cutting assembly 30 will not be employed to cut a second pair of aligned full sized holes with the tolerance of misalignment being exceeded with pilot diameter D2 not being able to extend through clearance gap C'. The fabricator as a result employs a repair protocol, which includes utilizing oversized aligned holes is positioned through components 10 and 12 through which an oversized fastener can be employed.

Bushing 60 associated with cutting section 34 can be seen in phantom in FIG. 6. Bushing 60 has a circular configuration and has a bushing diameter 62 to receive cutter assembly 30. Bushing diameter 62 is greater in dimension than cutting diameter D3 of cutter section 34 to allow guidance to cutter section 34 in operation of cutter assembly 30. The guidance facilitates the operator to maintain stability in operation of cutter assembly 30 and assist in maintaining cutting with cutting section 34 in substantially normal direction relative to first component 10. Bushing 60 surrounds cutter section 34 when cutter section 34 is positioned against surface 65 of first component 10, as seen in FIGS. 5 and 6.

Method 64 includes increasing a diameter D of an initial pair of holes 18 that includes first hole 20, which is defined by and extends through first component 10, and includes second hole 22, which is defined by and extends through second component 12. Method 64 can be applied to a range of misalignment of initial pair of holes which includes initial pair of holes 18 at a minimum amount of misalignment, including being aligned, as seen in FIGS. 2, 5, 7, 10, and 11 and with respect to first hole 20' and second hole 22' of initial pair of holes 18', which are in contrast at a greatest amount of misalignment for method 64, as seen in FIGS. 3, 8, and 12.

Method 64 includes step 66 of inserting pilot member 32 having pilot diameter D2 corresponding to a tolerance of misalignment of initial pair of holes 18, as earlier described, such that pilot member 32 passes through clearance gap C defined by at least a portion of a boundary 21 of first hole 20 of initial pair of holes 18 and at least a portion of boundary 23 of second hole 22 of initial pair of holes 18. Method 64 further includes step 68 of cutting a second pair of aligned holes 24 through first and second components 10, 12 respectively, with cutter section 34 associated with pilot member 32. In this example, cutter section 34 and pilot member 32 are connected with one another, wherein cutter section 34 has cutting diameter D3 larger than pilot diameter D2 and larger than diameter D of initial pair of holes 18.

With pilot member 32 having first central axis 36 and cutter section 34 having second central axis 42, with pilot member 32 and cutter section 34 connected to one another and with first central axis 36 and second central axis 42 being coaxial, step 66 of inserting pilot member 32 includes positioning first central axis 36 of pilot member 32 extending through clearance gap C. Step 68 of cutting second pair of aligned holes 24 includes cutting first hole 26 of second pair of aligned holes 24 and cutting second hole 28 of second pair of aligned holes 24, wherein first and second holes 26, 28 have central axis A, as seen in FIG. 4. Step 68 of cutting the second pair of aligned holes 24 includes cutting first hole 26 of the second pair of aligned holes 24 such that first hole 26 encircles boundary 21 of first hole 20 of initial pair of holes 18 and cutting second hole 28 of second pair of aligned holes 24 such that second hole 28 of second pair of aligned holes 24 encircles boundary 23 of second hole 22 of initial pair of holes 18.

Step 68 of cutting further includes at least one of cutting through first component 10 forming a boundary 27 of first hole 26 of second pair of aligned holes 24, which extends along line 45 tangential with the boundary 21 of the first hole 20 of the initial pair of holes 18 or cutting through the second component 12 forming a boundary 29 of the second hole 28 of the second pair of aligned holes 24, which extends along line 47 tangential with the boundary 23 of the second hole 22 of the initial pair of holes 18. This can be seen in FIG. 7, wherein pilot member 32 is positioned against boundary 21 and boundary 23 of first hole 20 and second hole 22, respectively, within and through clearance gap C. In this instance, cutting through first component 10 includes forming boundary 27 of first hole 26 of second pair of aligned holes 24, as seen in FIGS. 4, 7, and 11, which extends along line 45 tangential with boundary 21 of first hole of initial pair of holes 18. In this example, step 68 of cutting further includes also cutting through second component 12 forming boundary 29 of second hole 28 of second pair of aligned holes 24, which extends along line 47 tangential with boundary 23 of second hole 22 of initial pair of holes 18. This can also be seen in FIGS. 3, 8, and 12, wherein pilot member 32 is positioned extending through first hole 20' and second hole 22' of initial pair of holes 18' with initial pair of holes 18' positioned at a maximum position of misalignment in which cutter assembly 30 can operate to cut through first component 10 forming boundary 27, of first hole 26 of second pair of aligned holes 24, which extends along line 51 tangential with boundary 21' of first hole 20' of initial pair of holes 18'. In this example, step of cutting 68 further includes cutting through second component 12 forming boundary 29, of second hole 28 of second pair of aligned holes 24, which extends along line 53 tangential with boundary 23' of second hole 22' of initial pair of holes 18'. Line 51 tangential with boundary 21' of first hole 20' is not aligned with line 53 tangential with boundary 23' of second hole 22'.

Step 68 of cutting further includes, in the example where pilot member 32 extends through clearance gap C centrally positioned within clearance gap C of initial pair of holes 18, which are aligned, as seen in FIGS. 5 and 10, cutting first hole 26 of the second pair of aligned holes 24 to extend through first component 10 along and spaced apart from boundary 21 of first hole 20 of initial pair of holes 18. Step 68 of cutting further includes cutting second hole 28 of second pair of aligned holes 24 to extend through second component 12 along and spaced apart from boundary 23 of second hole 22 of initial pair of holes 18.

Step 68 of cutting further includes a step of inserting cutter section 34 into bushing 60. As described earlier, bushing 60 is used to assist in aligning cutter section 34 at the time of cutting second pair of aligned holes of full-sized aligned holes 24 such that cutting is conducted in a direction normal to component 10.

While various embodiments have been described above, this disclosure is not intended to be limited thereto. Variations can be made to the disclosed embodiments that are still within the scope of the appended claims.

What is claimed is:

1. A method for enlarging each one of an initial pair of holes, the initial pair of holes including a first hole, extending through a first component, and a second hole, extending through a second component, the method comprising steps of:

inserting a pilot member, corresponding to a tolerance of misalignment of the first hole and the second hole of the initial pair of holes such that the pilot member passes through a clearance gap, defined by at least a portion of a boundary of the first hole of the initial pair of holes and at least a portion of a boundary of the second hole of the initial pair of holes, and wherein the pilot member has a first central axis; and cutting a second pair of aligned holes through the first and second components, respectively, with a cutter section, which has a second central axis, and wherein the pilot member and the cutter section are connected to one another so that the first central axis of the pilot member and the second central axis of the cutter section are collinear.

2. The method of claim 1, wherein:

the step of inserting the pilot member includes positioning the first central axis of the pilot member, extending through the clearance gap;

the step of cutting the second pair of aligned holes includes a step of cutting a first hole of the second pair of aligned holes and a step of cutting a second hole of the second pair of aligned holes, wherein the first and second holes of the second pair of aligned holes have a central axis; and the step of cutting the first hole of the second pair of aligned holes includes encircling the boundary of the first hole of the initial pair of holes with the first hole of the second pair of aligned holes and the step of cutting the second hole of the second pair of aligned holes includes encircling the boundary of the second hole of the initial pair of holes with the second hole of the second pair of aligned holes.

3. The method of claim 2, wherein:

the step of cutting the first hole of the second pair of aligned holes includes cutting through the first component forming a boundary of the first hole of the second pair of aligned holes, wherein the boundary of the first hole of the second pair of aligned holes extends along a line, tangential with the boundary of the first hole of the initial pair of holes; and the step of cutting the second hole of the second pair of aligned holes includes cutting through the second component forming a boundary of the second hole of the second pair of aligned holes, wherein the boundary of the second hole of the second pair of aligned holes extends along a line, tangential with the boundary of the second hole of the initial pair of holes.

4. The method of claim 3, wherein the line, tangential with the boundary of the first hole of the initial pair of holes, aligns with the line, tangential with the boundary of the second hole of the initial pair of holes.

5. The method of claim 3, wherein the line, tangential with the boundary of the first hole of the initial pair of holes, is not aligned with the line, tangential with the boundary of the second hole of the initial pair of holes.

6. The method of claim 2, wherein:

the step of cutting the first hole of the second pair of aligned holes further includes extending the first hole of the second pair of aligned holes through the first component, positioned along and spaced apart from the boundary of the first hole of the initial pair of holes; and the step of cutting the second hole of the second pair of aligned holes further includes extending the second hole of the second pair of aligned holes through the second component, located along and spaced apart from the boundary of the second hole of the initial pair of holes.

7. The method of claim 1, wherein:
the pilot member and the cutter section form a cutter assembly;
the pilot member has a pilot diameter, corresponding to the tolerance of misalignment of the first hole of the initial pair of holes and the second hole of the initial pair of holes; and
the cutter section has a cutting diameter larger than the pilot diameter and is configured to produce the second pair of aligned holes in the first component and the second component, respectively, wherein the second pair of aligned holes each has a diameter equal to the cutting diameter.

8. The method of claim 7, wherein the pilot diameter is smaller than diameters of the first hole and the second hole of the initial pair of holes.

9. The method of claim 7, wherein the cutting diameter is larger than diameters of the first hole and the second hole of the initial pair of holes.

10. The method of claim 7, wherein the pilot member comprises a curved external surface, which extends around the first central axis.

11. The method of claim 10, wherein a cross section of the pilot member comprises the curved external surface defining a circular configuration which extends around the first central axis and defines the pilot diameter.

12. The method of claim 7, wherein the tolerance of misalignment includes a width dimension of the clearance gap, defined by at least a portion of the boundary of the first hole of the initial pair of holes and at least a portion of the boundary of the second hole of the initial pair of holes.

13. The method of claim 12, wherein:
the width dimension of the clearance gap allows the pilot member, having the pilot diameter, to extend through the clearance gap such that a circumference of the cutter section is positioned to cut the second pair of aligned holes; and
the cutting diameter is larger than diameters of the initial pair of holes such that a first hole of the second pair of aligned holes encircles the first hole of the initial pair of holes and a second hole of the second pair of aligned holes encircles the second hole of the initial pair of holes.

14. The method of claim 13, wherein, with the pilot member extending through the clearance gap, the cutter section is positioned to cut:
a boundary of the first hole of the second pair of aligned holes so that the boundary of the first hole of the second pair of aligned holes extends through the first component along a line, tangential with the boundary of the first hole of the initial pair of holes; and
a boundary of the second hole of the second pair of aligned holes so that the boundary of the second hole of the second pair of aligned holes extends through the second component along a line, tangential with the boundary of the second hole of the initial pair of holes.

15. The method of claim 14, wherein the line, tangential with the boundary of the first hole of the initial pair of holes, is aligned with the line, tangential with the boundary of the second hole of the initial pair of holes.

16. The method of claim 14, wherein the line, tangential with the boundary of the first hole of the initial pair of holes, is not aligned with the line, tangential with the boundary of the second hole of the initial pair of holes.

17. The method of claim 13, wherein, with the pilot member extending through the clearance gap, the cutter section is positioned to cut the first hole of the second pair of aligned holes so that the first hole of the second pair of aligned holes extends through the first component, positioned along and spaced apart from the boundary of the first hole of the initial pair of holes, and to cut the second hole of the second pair of aligned holes so that the second hole of the second pair of aligned holes extends through the second component, positioned along and spaced apart from the boundary of the second hole of the initial pair of holes.

* * * * *